United States Patent
McCloskey et al.

(10) Patent No.: US 12,118,579 B2
(45) Date of Patent: *Oct. 15, 2024

(54) SYSTEMS AND METHODS FOR REWARDS REDEMPTION ATM BANNERS

(71) Applicant: Wells Fargo Bank, N.A., San Francisco, CA (US)

(72) Inventors: Rebecca H. McCloskey, Cornelius, NC (US); Alicia Y. Moore, San Ramon, CA (US); Denny E. Puckett, Charlotte, NC (US); Jerome Rhodes, Hayward, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,302

(22) Filed: Aug. 17, 2023

(65) Prior Publication Data

US 2023/0394517 A1    Dec. 7, 2023

Related U.S. Application Data

(63) Continuation of application No. 16/148,739, filed on Oct. 1, 2018, now Pat. No. 11,776,000.

(51) Int. Cl.
*G06Q 30/02* (2023.01)
*G06Q 20/10* (2012.01)
(Continued)

(52) U.S. Cl.
CPC ..... *G06Q 30/0215* (2013.01); *G06Q 20/1085* (2013.01); *G06Q 30/0235* (2013.01); *G07F 19/211* (2013.01)

(58) Field of Classification Search
CPC ........... G06Q 30/0215; G06Q 20/1085; G06Q 30/0235; G06Q 20/4014; G07F 19/211; G07F 19/206
See application file for complete search history.

(56) References Cited

U.S. PATENT DOCUMENTS 8,408,455 B1 * 4/2013 Taylor ................ G06Q 20/1085
                                                              235/379
9,380,421 B1 * 6/2016 Vltavsky ................ G06Q 40/02
(Continued)

FOREIGN PATENT DOCUMENTS

CA      2578430 A1      3/2006
CA      2736215 A1 *    3/2010    ........... G06Q 20/387

OTHER PUBLICATIONS

Samuely, Citibank commits to beacons after merchants give the technology thumbs-up, 2017, https://www.retaildive.com/ex/mobilecommercedaily/citibank-commits-to-beacons-after-merchants-give-the-technology-a-thumbs-up, pp. 1-7 (Year: 2017).*

*Primary Examiner* — John Van Bramer
(74) *Attorney, Agent, or Firm* — Foley & Lardner LLP

(57) ABSTRACT

An automated teller machine ("ATM") includes a network interface, a display device, and an input/output device. The ATM further includes a processing circuit including a processor and a memory, the memory structured to store instructions that are executable by the processor. The instructions cause the processing circuit to receive authentication information from the customer and authenticate the customer using the authentication information, retrieve a real-time rewards balance of a rewards account associated with the customer, generate a banner for the customer based on the real-time rewards balance, and display the banner to the customer. The banner is selectable and activates a rewards functionality of the ATM to cause the ATM to display a screen including at least one of the real-time rewards balance or an option for the customer to redeem the rewards balance held by the customer when the banner is selected.

20 Claims, 9 Drawing Sheets

(51) Int. Cl.
*G06Q 30/0207* (2023.01)
*G06Q 30/0235* (2023.01)
*G07F 19/00* (2006.01)

(56) References Cited

U.S. PATENT DOCUMENTS

| | | | |
|---|---|---|---|
| 9,972,047 B1 | 5/2018 | Elliott et al. | |
| 10,242,382 B1 * | 3/2019 | Lambert | G06Q 30/0251 |
| 10,445,711 B1 * | 10/2019 | Arumugam | G06Q 20/3274 |
| 2003/0036952 A1 | 2/2003 | Panttaja et al. | |
| 2009/0198572 A1 | 8/2009 | Jurgens | |
| 2009/0313106 A1 | 12/2009 | Taylor et al. | |
| 2011/0213665 A1 | 9/2011 | Joa et al. | |
| 2012/0232984 A1 | 9/2012 | Mooney | |
| 2014/0074569 A1 * | 3/2014 | Francis | G06Q 20/204 |
| | | | 705/14.3 |
| 2014/0207680 A1 | 7/2014 | Rephlo | |
| 2015/0287018 A1 * | 10/2015 | Iqbal | G06Q 20/3221 |
| | | | 705/44 |
| 2017/0178462 A1 * | 6/2017 | Arora | G07F 19/202 |

* cited by examiner

SYSTEMS AND METHODS FOR REWARDS REDEMPTION ATM BANNERS

CROSS-REFERENCE TO RELATED APPLICATION

The present application is a continuation of U.S. patent application Ser. No. 16/148,739, entitled "SYSTEMS AND METHODS FOR REWARDS REDEMPTION ATM BANNERS," filed Oct. 1, 2018, which is incorporated herein in its entirety and for all purposes.

TECHNICAL FIELD

Embodiments of the present disclosure relate generally to the field of automated teller machines.

BACKGROUND

Financial institutions provide various ways for customers to access account information and perform transactions, such as transaction machines, websites, and brick-and-mortar-locations (e.g., retail bank branches). Transaction machines, such as automated teller machines (ATMs), may be accessed at various geographic locations, such as bank locations, convenience stores, or other stores to facilitate the account holder's interaction with banking systems. Transaction machines accept transaction cards such as debit, credit, or stored value cards that are often used by account holders to purchase items or services or to obtain funds.

SUMMARY

One embodiment relates to an ATM. The ATM includes a network interface configured to communicate data via a network, a display device configured to present information to a customer, and an input/output device configured to exchange data with the customer. The ATM also includes a processing circuit including a processor and a memory, the memory structured to store instructions that are executable by the processor. The instructions cause the processing circuit to receive, by at least one of the input/output device or the display device, authentication information from the customer and authenticate, by the network interface, the customer using the authentication information. The instructions further cause the processing circuit to retrieve, by the network interface, a real-time rewards balance of a rewards account associated with the customer; generate a banner for the customer based on the real-time rewards balance; and display, by the display device, the banner to the customer. The banner is selectable and activates a rewards functionality of the ATM to cause the ATM to display a screen including at least one of the real-time rewards balance or an option for the customer to redeem the rewards balance held by the customer when the banner is selected.

Another embodiment relates to a method of generating a banner for a customer. The method includes receiving, by an ATM, authentication information from a customer and authenticating, by the ATM, the customer using the authentication information. The method further includes retrieving, by the ATM, a real-time rewards balance of a rewards account associated with the customer; generating, by the ATM, a banner for the customer based on the real-time rewards balance; and displaying, by the ATM, the banner to the customer. The banner is selectable and activates a rewards functionality of the ATM to cause the ATM to display a screen including at least one of the real-time rewards balance or an option for the customer to redeem the rewards balance held by the customer when the banner is selected.

Another embodiment relates to an ATM. The ATM includes a network interface configured to communicate data via a network, a display device configured to present information to a customer, and an input/output device configured to exchange data with the customer. The ATM also includes a processing circuit including a processor and a memory, the memory structured to store instructions that are executable by the processor. The instructions cause the processing circuit to receive, by at least one of the input/output device or the display device, authentication information from the customer and authenticate, by the network interface, the customer using the authentication information. The instructions further cause the processing circuit to retrieve, by the network interface, a real-time rewards balance of a rewards account associated with the customer; determine whether the real-time rewards balance includes any rewards that are expiring within a certain amount of time; generate a banner for the customer based on the real-time rewards balance, the banner including at least one of an ad including the real-time rewards balance of the customer or, in response to determining that the rewards balance includes rewards expiring within the certain amount of time, an indication that at least a portion of the rewards balance is expiring soon; and display, by the display device, the banner to the customer. The banner is selectable and activates a rewards functionality of the ATM to cause the ATM to display a screen including at least one of the real-time rewards balance or an option for the customer to redeem the rewards balance held by the customer when the banner is selected.

DETAILED DESCRIPTION

Figure 1:
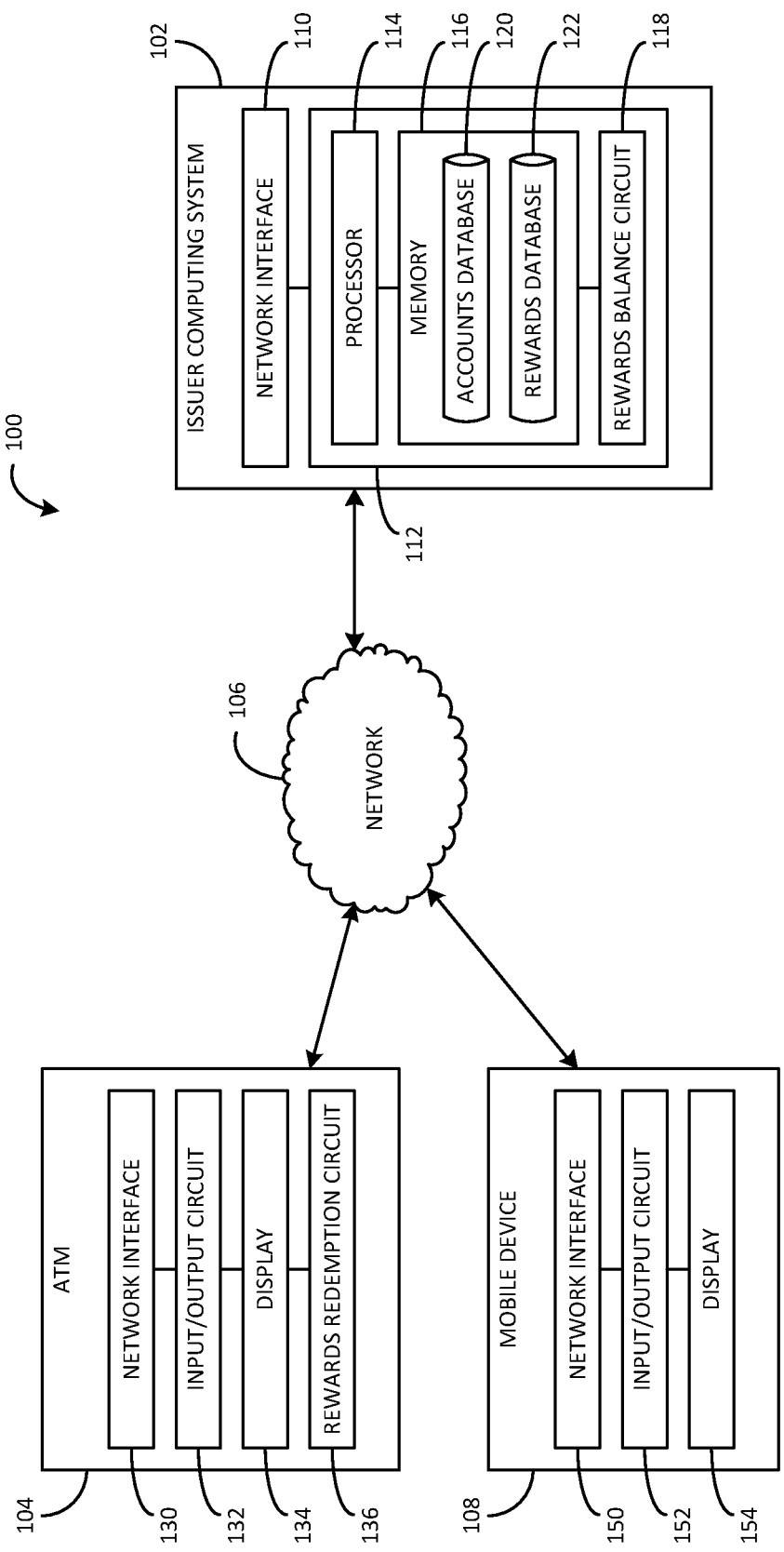
FIG. 1 is an environmental view of an ATM system for rewards points redemption, according to an example embodiment.

Referring to the Figures generally, various systems, methods, and apparatuses for providing rewards points redemption services to a customer are described herein. More particularly, systems and methods for using an ATM to display information about a customer's real-time rewards balance, including expiring rewards, if any, and encourage the customer to redeem the rewards balance are described herein.

An example embodiment is described as follows. A customer holds a rewards account connected to a payment card (e.g., a credit card account, a debit card account)

associated with an issuer. The rewards account is structured such that the customer earns a rewards balance (e.g., rewards points, cashback rewards) in the customer's rewards account by using the payment account. For example, the customer earns one rewards point per dollar the customer spends using the payment account. In some arrangements, the customer's rewards balance will expire if unused after a certain amount of time, such as after sixty months.

The customer can access an ATM associated with the issuer. When accessed, the ATM retrieves real-time information about the customer's rewards balance from the issuer and generates a customer-specific banner based on the real-time rewards balance, which the ATM displays to the customer (e.g., as a rewards balance ad shown as part of a main menu of the ATM). Additionally, if the ATM determines that at least some of the customer's rewards balance will expire soon (e.g., within 30 days, within 60 days), the ATM generates a banner informing the customer of the expiring balance, which the ATM displays to the customer. The customer can click on the banner, and in response, the ATM redirects the customer to a screen relating to the rewards balance. For example, the screen shows the customer additional information about the customer's rewards balance and/or allows the customer to redeem the customer's rewards balance. Further, in some arrangements, if at least some of the customer's rewards balance will expire soon, the screen indicates which of the customer's rewards balance will expire and when.

The systems and methods described herein offer technical advantages for redeeming a rewards balance. With many payment account rewards systems, the rewards balance expires after a certain amount of time, but the customer may not be aware of exactly when the rewards balance expires. With some systems, customers are notified of rewards balance expiration dates, such as on statement balances for a payment account associated with the rewards account, but customers may not keep track of the expiration dates or check the notification systems. As such, many customers unknowingly allow their rewards balances to expire without redeeming them, causing the customers to have negative experiences with the rewards system. This, in turn, can decrease the customer's engagement with the customer's payment account, which is detrimental to the issuer of the payment account. Additionally, many customers contact the issuer associated with their rewards account, such as through email or by calling a customer service line, when their rewards balances expire. This can create traffic on the issuer's computing and call centers that the issuer must process and which would be unnecessary had the customer simply redeemed the rewards balance before it expired.

As such, generating notifications to customers with rewards balances that are expiring soon when they access an ATM provides technical advantages over current systems and methods for rewards balance redemption. The notifications raise customer awareness of when their balances expire and, in some implementations, allow the customers to redeem expiring balances concurrently at the ATM. As such, customers may have more positive experiences with the rewards system, causing them to remain more engaged with the rewards system and remain longer, better customers of the issuer. Additionally, because the notifications help customers redeem their rewards points before they expire, fewer customers may contact the issuer of the rewards account, thereby decreasing email and phone traffic that the issuer's computing systems must handle and freeing bandwidth and processing capacity for other tasks.

Additionally, the present systems and methods generate banners, such as ads, in real-time or near real-time (e.g., once the customer's authentication credentials used to access the ATM are verified). This is advantageous over ATM systems that do not generate banners in real-time or near real-time because, for example, customers may redeem some or all of their rewards balance, or earn significant amounts of rewards, and soon afterwards visit an ATM where the customers are shown a banner with an incorrect rewards balance. Moreover, in some implementations, periodically pulling customer rewards balance information and loading those files to an advertising system used by ATMs is manually intensive for computing systems doing the rewards balance pulling and loading. As an illustration, computing systems pulling customer rewards balance information and loading those files to an advertising system used by ATMs may pull a number of files that are unnecessary because many customers do not visit ATMs on a weekly basis. By contrast, the present systems and methods optimize this process by generating ATM banners for customers who are actually using an ATM.

Accordingly, there are technical advantages to pulling real-time rewards balance information for a customer and including that real-time rewards balance information in ATM banners. Doing so creates less confusion for customers using ATMs to redeem rewards balances, thereby creating more positive experiences for the customers with the rewards system and causing the customers to be more likely to continue using the associated payment account(s) and remain customers of the issuer. Further, connecting ATMs to databases storing rewards balance information for customers can decrease the work performed by the computing systems of the issuer, which no longer must manually pull rewards balance information and load those files to an ATM advertising system, for example, on a weekly basis. The issuer's computing systems and ATMs thus operate more efficiently are freed for other tasks.

Referring now to FIG. 1, an environmental view of an ATM system for rewards balance redemption 100 is shown, according to an example embodiment. As described in further detail below, the system 100 includes an issuer computing system 102, an ATM 104, and a mobile device 108 connected by a secure network (e.g., network 106). The issuer computing system 102 and the ATM 104 are both associated with an issuer of payment accounts (e.g., demand deposit accounts, credit or debit accounts, brokerage accounts).

The issuer computing system 102 provides and maintains payment accounts on behalf of various customers of the issuer. In the context of the present disclosure, the issuer can include commercial or private banks, credit unions, investment brokerages, mobile wallet providers, and so on. In various arrangements, the issuer additionally issues payment cards to the customers of the issuer (e.g., credit cards, debit cards), and the issuer computing system 102 processes payments made by the customers using the payment cards. In some arrangements, the issuer computing system 102, alternatively or additionally, processes payments made by the customer using a mobile wallet account of the customer associated with a payment account held with the issuer.

Additionally, the issuer computing system 102 provides and maintains rewards accounts on behalf of various customers. In various arrangements, each customer rewards account is associated with one or more payment accounts held by the same customer with the issuer. As an example, a customer holds a credit card account with the issuer and a rewards account associated with the credit card account.

Accordingly, the customer earns rewards in his or her rewards account by making purchases using the associated account(s). For example, the customer earns a certain number of rewards points (e.g., one point per dollar spent) or a certain amount of cashback rewards (e.g., 2% cashback on every purchase) by using a credit card associated with the rewards account.

The issuer computing system 102 can provide various versions of rewards. Examples of rewards include rewards points, cash rewards, travel or hotel rewards, gas rewards, and so on. Additionally, the customer redeems earned rewards for various rewards items. For example, in some embodiments, a customer redeems earned rewards by exchanging them for physical or digital goods or services. As an illustration, a customer redeems a certain number of rewards points for an airline ticket or a gift card. In other embodiments, a customer redeems earned rewards for cash or a cash balance. For example, a customer's rewards are reflected as a cashback bonus that the customer can apply as a statement credit, receive as a check, receive as a gift card, receive as cash, and so on. Further, in some embodiments, a customer's rewards balance have an expiration date by or before when the customer must redeem the rewards balance. In one example, rewards expire sixty months after the month in which they were earned. In another example, rewards do not expire as long as a customer takes one or more actions, such as by keeping a minimum balance in the customer's payment account associated with the rewards account or by continuing to spend a certain amount of money from the customer's payment account.

Additionally, rewards are earned in different ways according to different embodiments. In one embodiment, spending a certain amount of money earns the customer a certain amount of rewards. For example, spending a dollar earns the customer one rewards point. As another example, spending a dollar earns the customer two cents in cashback rewards. In another embodiment, the customer earns more rewards by making certain purchases or by making purchases at certain retailers or businesses. In one example, the customer generally earns one rewards point per dollar spent on most goods and services but earns three points per dollar spent at gas stations. In another example, the customer earns 2% cashback on grocery purchases and 3% cashback on travel purchases. In some implementations, the customer earns additional rewards based on rotating categories. For example, in the first quarter, the customer earns 4% extra in cashback rewards on restaurant purchases, and the customer earns 4% extra in cashback rewards on gas purchases in the second quarter. In yet another embodiment, the customer alternatively or additionally earns rewards by performing certain actions. As an example, the customer earns an extra 1% in cashback rewards by paying off the customer's credit card balance in full by the customer's monthly payment deadline.

As shown in FIG. 1, the issuer computing system 102 includes a network interface 110 and a processing circuit 112. The network interface 110 is used to establish connections via the network 106 between the issuer computing system 102 and other device or computing systems such as the ATM 104. The network interface 110 further supports communication between the issuer computing system 102 and other devices or computing systems (e.g., other computing systems used in processing credit card transactions, such as merchant computing systems).

The processing circuit 112 includes a processor 114, a memory 116, and a rewards balance circuit 118. Additionally, as shown in FIG. 1, the issuer computing system 102 includes an accounts database 120 and a rewards database 122. The accounts database is structured to retrievably store information relating to payment accounts held by various customers of the issuer associated with the issuer computing system 102. In some embodiments, the accounts database 120 includes personal information (e.g., names, addresses, phone numbers), authentication information (e.g., username/password combinations, device authentication tokens, security question answers, unique customer identifiers, biometric data), and financial information (e.g., mobile wallet token information, account numbers, account balances, available credit, credit history, transaction histories) relating to the various customers of the issuer and their associated payment accounts.

The rewards database 122 is structured to retrievably store information relating to rewards accounts held by various customers of the issuer associated with the issuer computing system 102. The information stored in the rewards database 122 includes, for example, rewards balances for various customers, when some or all of the rewards balances expire, what the customer can redeem rewards for, what the customer has redeemed rewards for in the past, and so on.

The rewards balance circuit 118 is configured to store and update rewards account information for various customers. For example, if a customer has a payment account associated with a rewards account and the customer makes a purchase using the payment account, the rewards balance circuit 118 is configured to update the customer's rewards balance in the rewards database 122 with the rewards earned from that purchase. In addition, the rewards balance circuit 118 is configured to retrieve stored rewards information for various customers. To illustrate, in response to a query from an authorized entity (e.g., from the ATM 104) about a customer's rewards balance, the rewards balance circuit 118 is configured to provide the entity with the customer's rewards balance. In some implementations, the rewards balance circuit 118 also provides the entity with information related to the query. Referring again to the example from above, in response to a query about a customer's rewards balance from the authorized entity, the rewards balance circuit 118 is also configured to provide information about which rewards items the customer has most frequently redeemed rewards for, in addition to providing information about the customer's rewards balance.

The ATM 104 is configured to perform various banking services for a user. In various arrangements, the ATM 104 provides a number of banking services for a customer of the issuer. In some arrangements, the ATM 104 is also configured to perform banking services for a non-customer of the issuer (e.g., provide limited banking services to a non-customer for a fee). In some embodiments, the ATM 104 is configured to perform banking services when the user of the ATM 104 inserts a payment card into the ATM 104. Additionally or alternatively, in certain embodiments, the ATM 104 is configured to perform banking services when the user of the ATM 104 provides the ATM 104 with a mobile wallet associated with the user. In response to receiving a payment card and/or mobile wallet, the ATM 104 authenticates the user and allows the user to perform banking actions at the ATM 104. As an example, depending on whether the user is a customer or non-customer of the issuer, the customer can dispense cash withdrawn from an account of the user, deposit checks into an account of the user, view account balances, transfer money from an account of the user, and/or purchase stamps. Additionally, in various arrangements, if the user is a customer of the issuer, the customer can view rewards points balances and redeem rewards points balances at the ATM 104.

As shown in FIG. 1, the ATM 104 includes a network interface 130, an input/output circuit 132, a display 134, and a rewards redemption circuit 136. The network interface 130 is used to establish connections via the network 106 between the ATM 104 and other devices or computing systems, such as the issuer computing system 102 or an issuing computing system unaffiliated with the ATM 104. The network 106 further supports communication between the ATM 104 and other devices or computing systems.

The input/output circuit 132 is structured to receive communications from and provide communications to a user of the ATM 104. In this regard, the input/output circuit 132 is structured to exchange data, communications, instructions, etc. with an input/output component of the ATM 104. Accordingly, in one embodiment, the input/output circuit 132 includes an input/output device. In another embodiment, the input/output circuit 132 includes communication circuitry for facilitating the exchange of data, values, messages, and the like between an input/output device and the components of the ATM 104. In yet another embodiment, the input/output circuit 132 includes machine-readable media for facilitating the exchange of information between an input/output device and the components of the ATM 104. In still another embodiment, the input/output circuit 132 includes any combination of hardware components, communication circuitry, and machine-readable media.

In various embodiments, the display 134 is a screen, a touchscreen, etc. In some arrangements, the ATM 104 uses the display 134 to communicate information to the user, for example, by displaying information to the user on the display 134. In some arrangements, the ATM 104 additionally uses the display 134 to receive communications from the user, for example, through a keyboard provided on a touchscreen of the display 134 or through selectable options shown to the user on a touchscreen of the display 134. Accordingly, in certain arrangements, the display 134 is incorporated as an input/output device associated with the input/output circuit 132.

The rewards redemption circuit 136 is configured to provide rewards redemption services to customers of the issuer. In various embodiments, once a customer has been authenticated, the rewards redemption circuit 136 is configured to communicate with the issuer computing institution 102 to retrieve the customer's real-time rewards balance from the rewards database 122 (e.g., via the rewards balance circuit 118). Based on the customer's real-time rewards balance, the rewards redemption circuit 136 is configured to generate banners, such as ads, specific to the customer that are shown on the display 134. For example, the rewards redemption circuit 136 is configured to display the customer's current rewards balance on an ad on the display 134 of the ATM 104. In some arrangements, the rewards redemption circuit 136 displays the banner to the customer as part of a main menu for the ATM 104. In other arrangements, the rewards redemption circuit 136 displays the banner on various screens of the ATM 104 (e.g., on a top or bottom portion of each screen shown to the customer as the customer navigates through various functions provided by the ATM 104).

The rewards redemption circuit 136, in some embodiments, is further configured to determine whether the customer is eligible for a banner before generating and displaying the banner. For example, the rewards redemption circuit 136 is configured to only generate the banner if the customer has at least a non-zero rewards balance or a minimum rewards balance that meets or exceeds a threshold (e.g., enough to redeem for a lowest rewards tier item, enough to redeem for $25).

In some embodiments, the rewards redemption circuit 136 is configured to show what the customer can redeem the customer's rewards for in the banner. For example, the ATM 104 displays an amount of cash that the customer can redeem the customer's rewards for in the banner. As another example, the ATM 104 displays information about a physical or digital item, such as an airline ticket or an electronics item, that the customer can redeem the customer's rewards for in the banner. In some arrangements, the rewards redemption circuit 136 is configured to show the customer the maximum amount and/or item that the customer can redeem the customer's rewards for in the banner.

Additionally, in certain embodiments, the rewards redemption circuit 136 is configured to further customize the banner for the customer. For example, in some arrangements, the rewards redemption circuit 136 is configured to display information about one or more suggested rewards items that the rewards redemption circuit 136 predicts the customer would like to redeem rewards for in an ad shown to the customer (e.g., based on the customer's redemption history, based on redemption histories of other customers similar to the customer). As an illustration, the rewards redemption circuit 136 determines that the customer has historically redeemed rewards for cash. As such, the rewards redemption circuit 136 includes the amount of cash that the customer can redeem his or her rewards for in the ad. As another illustration, the rewards redemption circuit 136 determines that other customers similar to the customer (e.g., based on geographic location, purchase histories, account balances, biographical information) often redeem rewards points for travel. Accordingly, the rewards redemption circuit 136 displays information about an airline ticket that the customer can redeem rewards for in the ad.

In some embodiments, the customer can select the banner, in response to which the customer is redirected to a rewards redemption screen. The customer can then redeem some or all of the customer's rewards using the rewards redemption screen (e.g., redeem the rewards for cash, redeem the rewards for a statement credit). In certain embodiments, in response to the customer selecting the banner, the customer is taken to a screen for redeeming the customer's rewards balance for cash or a screen for redeeming the customer's rewards balance for a rewards item displayed to the customer on the banner. Alternatively, the customer can directly redeem the rewards balance by selecting the banner. For example, the ATM 104 is configured to dispense the maximum amount of cash redeemable by the customer in response to the customer selecting the banner. In other embodiments, the customer can select the banner, in response to which the customer is redirected to a rewards balance screen. The customer can review the customer's rewards balance and, from there, navigate to a rewards redemption screen.

Additionally, the rewards redemption circuit 136 is configured to determine, based on the customer's real-time rewards balance, whether any of the customer's rewards balance is expiring soon (e.g., within a certain amount of time based on the present date). In one example, the rewards redemption circuit 136 is configured to determine whether any of the customer's rewards points are expiring within ninety days, within sixty days, within thirty days, within a week, and so on. In another example, the rewards redemption circuit 136 is configured to determine whether any of the customer's rewards points are expiring by the end of the current week, by the end of the current month, by the end of the next month, and so on. If any of the customer's rewards points are expiring soon, the rewards redemption circuit 136 is configured to generate a banner indicating the same.

In some embodiments, the banner is configured to indicate that a portion of the customer's rewards balance is expiring soon, and the customer must navigate to a rewards balance screen or a rewards redemption screen (e.g., by selecting the banner) to view the amount of the customer's rewards balance that is expiring. In other embodiments, the banner is configured to show how much of the customer's rewards balance is expiring and/or when the rewards balance is expiring. Further, in certain embodiments, the rewards redemption circuit 136 is configured to show what the customer can redeem the expiring rewards for on the banner (e.g., based on the maximum amount of expiring points the customer can redeem, based on the customer's redemption history, based on redemption histories of other customers similar to the customer). Additionally, in some implementations, the rewards redemption circuit 136 is configured to generate and display the banner only if the customer has a certain amount of expiring rewards or a certain amount of total rewards.

As described above, the customer can also select the banner, in response to which, depending on the embodiment, the customer is redirected to a rewards balance screen, the customer is redirected to a rewards redemption screen, the customer automatically redeems some or all of the customer's rewards balance (e.g., the expiring rewards balance), and so on. In some embodiments, in response to the customer selecting the banner, the rewards redemption circuit 136 is configured to display a rewards balance screen to the customer that includes what portion of the customer's rewards balance is expiring and when. As an example, the rewards redemption screen includes the customer's total rewards points balance and a box indicating the portion of the customer's rewards that is expiring and when that portion will expire. Additionally, in various implementations, the rewards redemption circuit 136 is configured to display the expiring rewards information on the rewards redemption screen regardless of whether the customer navigates to the screen via the banner or via another functionality of the ATM 104 (e.g., by selecting a "rewards balance" or "rewards redemption" option on a menu of the ATM 104).

The mobile device 108 is associated with a customer accessing the ATM 104. Such a mobile device includes any type of mobile device operated by a customer in connection with services provided with the ATM 104 including, but not limited to, a phone (e.g., a smartphone), a computing device (e.g., a tablet computer, a laptop computer, a personal digital assistant), a wearable device (e.g., a smart watch, smart glasses, a smart bracelet), and so on.

As shown in FIG. 1, the mobile device 108 includes a network interface 150, an input/output circuit 152, and a display 154. The network interface 150 is used to establish connections via the network 106 between the mobile device 108 and other device or computing systems, such as the ATM 104. The network 106 further supports communication between the mobile device 108 and other devices or computing systems.

The input/output circuit 152 is structured to receive communications from and provide communications to the customer associated with the mobile device 108. In this regard, the input/output circuit 152 is structured to exchange data, communications, instructions, etc. with an input/output component of the mobile device 108. Accordingly, in one embodiment, the input/output circuit 152 includes an input/output device. In another embodiment, the input/output circuit 152 includes communication circuitry for facilitating the exchange of data, values, messages, and the like between an input/output device and the components of the mobile device 108. In yet another embodiment, the input/output circuit 152 includes machine-readable media for facilitating the exchange of information between an input/output device and the components of the mobile device 108. In still another embodiment, the input/output circuit 152 includes any combination of hardware components, communication circuitry, and machine-readable media.

In various embodiments, the display 154 is a screen, a touchscreen, etc. In some arrangements, the mobile device 108 uses the display 154 to communicate information to the user, for example, by displaying information to the user on the display 154. In some arrangements, the mobile device 108 additionally uses the display 154 to receive communications from the user, for example, through a keyboard provided on a touchscreen of the display 154. Accordingly, in certain arrangements, the display 154 is incorporated as an input/output device associated with the input/output circuit 152.

Referring back to the rewards redemption circuit 136 of the ATM 104, in some embodiments, the rewards redemption circuit 136 is further configured to provide additional notifications to the customer regarding the customer's real-time rewards balance. For example, in some arrangements, the rewards redemption circuit 136 is configured to communicate with the mobile device 108 of the customer.

In one embodiment, the input/output circuit 132 of the ATM 104 includes a short-range communication device, such as a near-field communication ("NFC") or radio frequency identification ("RFID") device, that is configured to communicate with a corresponding short-range communication device in the mobile device 108 of the customer (e.g., incorporated or communicably coupled to the input/output circuit 152). Accordingly, the customer can use the mobile device 108 to access the ATM 104 using the short-range communication device (e.g., through a mobile wallet of the customer's mobile device 108, as described in further detail below), and the rewards redemption circuit 136 senses that the customer's mobile device 108 is proximate the ATM 104. In another embodiment, when the customer accesses the ATM 104, the rewards redemption circuit 136 is configured to determine whether the customer's mobile device 108 is within a certain proximity of the ATM 104, for example, based on a short-range communication device of the mobile device 108 or based on a different functionality of the mobile device 108 (e.g., based on a global positioning system ("GPS") of the mobile device 108 such that the location of the mobile device 108 is provided to the ATM 104, for instance, via a banking application running on the mobile device 108). In such embodiments when the customer is authenticated at the ATM 104 and the rewards redemption circuit 136 senses that the customer's mobile device 108 is within a certain proximity of the ATM 104, the rewards redemption circuit 136 is configured to provide a notification regarding the customer's real-time rewards balance to the customer's mobile device 108. For example, the rewards redemption circuit 136 is configured to send the mobile device 108 a pop-up notification, a push notification, (e.g., via a banking application running on the mobile device 108), or a text message including the customer's real-time rewards balance, whether the customer has any expiring rewards, suggested items for the customer to exchange the rewards balance for, and so on. Depending on the implementation, the rewards redemption circuit 136 is configured to send the notification via cellular data, via WiFi, via NFC, and so on.

Alternatively, in another embodiment, the rewards redemption circuit 136 is configured to determine that the mobile device 108 is within a certain proximity of the ATM 104 based on information transmitted to the ATM 104 by the mobile device 108 (e.g., via the network interface 150 or the input/output circuit 152). For example, a banking application affiliated with the issuer gathers location data of the mobile device 108 (e.g., based on GPS functionality of the mobile device 108), determines when the mobile device 108 is within a certain distance of the ATM 104, and when the mobile device 108 is within that distance, transmits information about the customer or the mobile device 108 to the ATM 104. Once the rewards redemption circuit 136 receives the information transmitted from the mobile device 108, the rewards redemption circuit 136 accordingly transmits a notification regarding the customer's real-time rewards balance to the customer's mobile device 108. In one example, the rewards redemption circuit 136 transmits the customer's current rewards balance to the mobile device 108, including an indication of a portion of the rewards balance, if any, that is expiring soon. In another example, the rewards redemption transmits a notification indicating to the customer that the customer can redeem the customer's rewards balance at the ATM 104. As an illustration, the rewards redemption circuit 136 transmits a text message to the mobile device 108 including the customer's present location (e.g., based on GPS information gathered by the mobile device 108), a location of the ATM 104 relative to the customer's present location, and the customer's real-time rewards balance.

In other arrangements, alternatively or additionally, the rewards redemption circuit 136 provides notifications to the customer regarding the customer's real-time rewards balance through other methods. In one implementation, when the customer performs a transaction at the ATM 104, the rewards redemption circuit sends the customer an email message including the customer's real-time rewards balance and/or whether the customer has any expiring rewards. In another implementation, the rewards redemption circuit 136 includes real-time rewards information for the customer on a paper or electronic ATM receipt that the customer receives from the ATM 104 after performing a transaction at the ATM 104.

Figure 2:
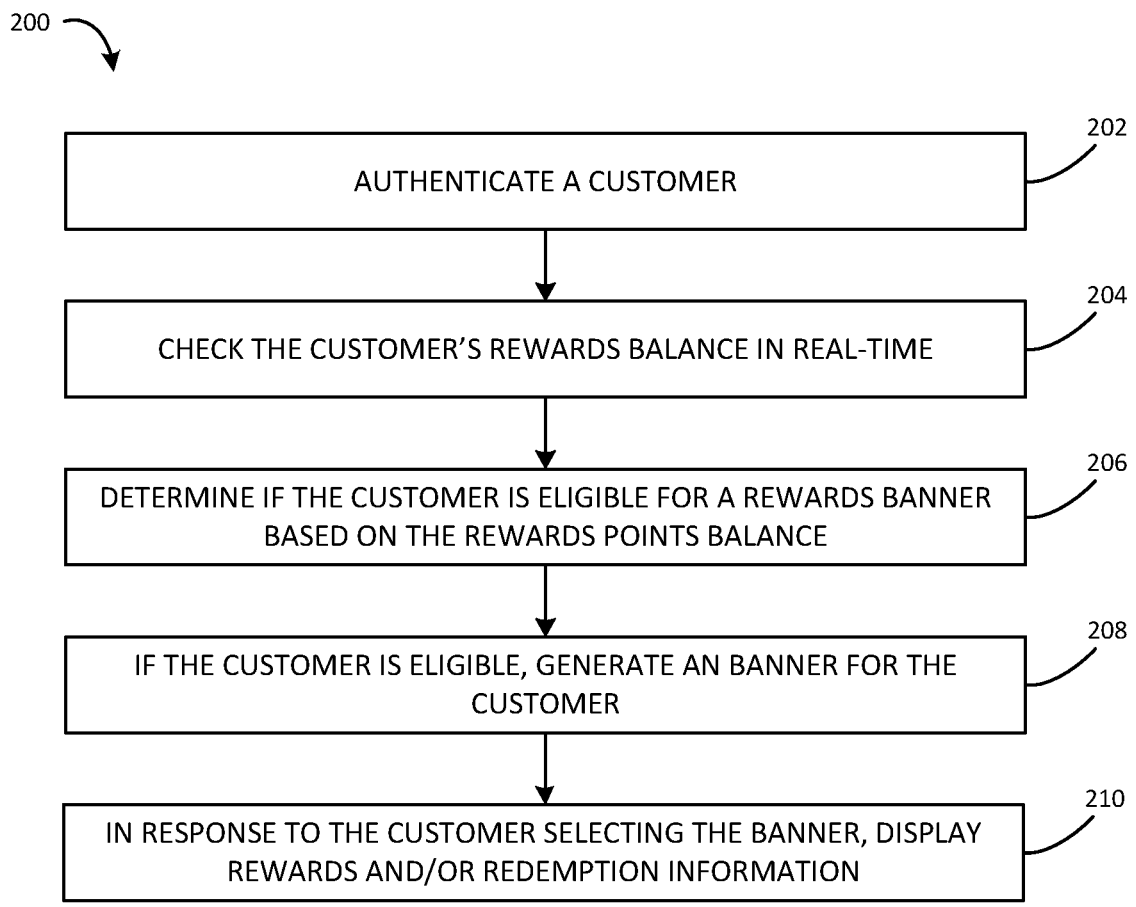
FIG. 2 is a flow diagram illustrating a method of generating a real-time rewards redemption banner for a customer that is displayed on an ATM, according to an example embodiment.

Referring now to FIG. 2, a flow diagram illustrating a method 200 of generating a real-time rewards redemption banner is shown, according to an example embodiment. First, a customer is authenticated at an ATM (e.g., ATM 104) at 202. In some embodiments, the customer provides a payment card to the ATM 104 (e.g., via an input/output device of the ATM 104), where the payment card is associated with a payment account that the customer holds with an issuer and the issuer is also associated with the ATM 104. The customer then provides authentication information, such as a personal identification number ("PIN") or a biometric, to the ATM 104 (e.g., via a keypad of the ATM 104, via a touchscreen of the display 134 of the ATM 104). The ATM 104 authenticates the customer using the authentication information. For example, in some embodiments, the ATM 104 communicates with the issuer computing system 102 to verify the authentication information with information for the customer stored in the accounts database 120. If the customer is authenticated, the ATM 104 allows the customer to access the banking operations provided by the ATM 104.

In other embodiments, the customer maintains a tokenized payment card on a mobile wallet belonging to the customer (e.g., on a mobile wallet application or circuit on the mobile device 108 associated with the customer). The customer then provides the payment card token to the ATM 104. For example, an NFC or RFID circuit of the customer's mobile device 108 provides the token to a corresponding NFC or RFID circuit of the ATM 104 (e.g., incorporated as part of the input/output circuit 132). The customer then provides authentication information to the ATM 104. In some arrangements, the customer provides the authentication information directly using the ATM 104, similar to the payment card examples discussed above. In other arrangements, the customer provides the authentication information using the customer's mobile device 108, such as by inputting a PIN into the customer's mobile device 108, by providing a biometric (e.g., a fingerprint) to the customer's mobile device 108, and so on. The customer's mobile device 108 then communicates the authentication information to the ATM 104 (e.g., using the NFC or RFID circuit), and the ATM 104 authenticates the customer using the authentication information (e.g., as described above with reference to the payment card example). Alternatively, the customer's mobile device 108 communicates the authentication information directly to the issuer computing system 102 (e.g., via the network 106 or via a different secure network). The issuer computing system 102 authenticates the customer using the authentication information, such as by verifying the information with customer information stored in the accounts database 120, and communicates to the ATM 104 that the customer has been authenticated. The ATM 104 then allows the customer to access the banking operations provided by the ATM 104.

Once the customer is authenticated, the customer's rewards balance is checked in real-time at 204. In various embodiments, the rewards redemption circuit 136 of the ATM 104 is configured to communicate with the rewards balance circuit 118 to retrieve the customer's rewards balance in real-time from the rewards database 122 of the issuer computing system 102. As an example, the rewards redemption circuit 136 uses identifying information associated with the customer (e.g., provided by the customer to the ATM 104, retrieved from the accounts database 120) to find and retrieve the customer's rewards balance in in the rewards database 122.

Whether the customer is eligible for a rewards redemption banner is determined at 206. For example, the rewards redemption circuit 136 determines that the customer is eligible for a rewards redemption banner if the customer has a non-zero rewards balance. As another example, the rewards redemption circuit 136 determines that the customer is eligible for a rewards redemption banner if the customer has or exceeds a certain rewards balance threshold (e.g., enough rewards to exchange for the lowest-costing rewards item offered by the issuer, enough to redeem for $10).

If the customer is eligible for a rewards redemption banner, a banner is generated for the customer at 208. In some embodiments, the rewards redemption circuit 136 is configured to include the customer's real-time rewards balance in the banner. Additionally, in some embodiments, the rewards redemption circuit 136 is configured to show the customer what the customer can redeem the customer's rewards balance for in the banner and/or further customize the banner for the customer (e.g., by including a predicted rewards item that the customer can exchange the customer's rewards balance for based on the customer's past rewards redemptions), as discussed above with reference to FIG. 1.

Additionally, the rewards redemption banner is configured such that the banner is selectable by the customer (e.g., by a touchscreen of the display 134 of the ATM 104, by an input/output device of the ATM 104).

In response to the customer selecting the rewards redemption banner, rewards and/or redemption information is shown to the customer at 210. In some embodiments, the customer is redirected to a screen showing the customer the customer's current rewards balance and a section the customer can use to redeem some or all of the customer's rewards balance. In one example, the screen includes a button that the customer can select to redirect the customer to a rewards redemption screen, through which the customer can redeem some or all of the customer's rewards balance. In another example, the screen includes both the rewards balance and a portion whereby the customer can redeem the customer's rewards balance for one or more rewards items (e.g., cash dispensed by the ATM 104, an account credit, a travel item such as a ticket). Additionally, in certain embodiments, the screen includes or can be configured to include the customer's rewards balance from multiple rewards accounts held by the customer (e.g., the rewards balance for personal account held by the customer and the rewards balance for a business account held by the customer).

Figure 3:
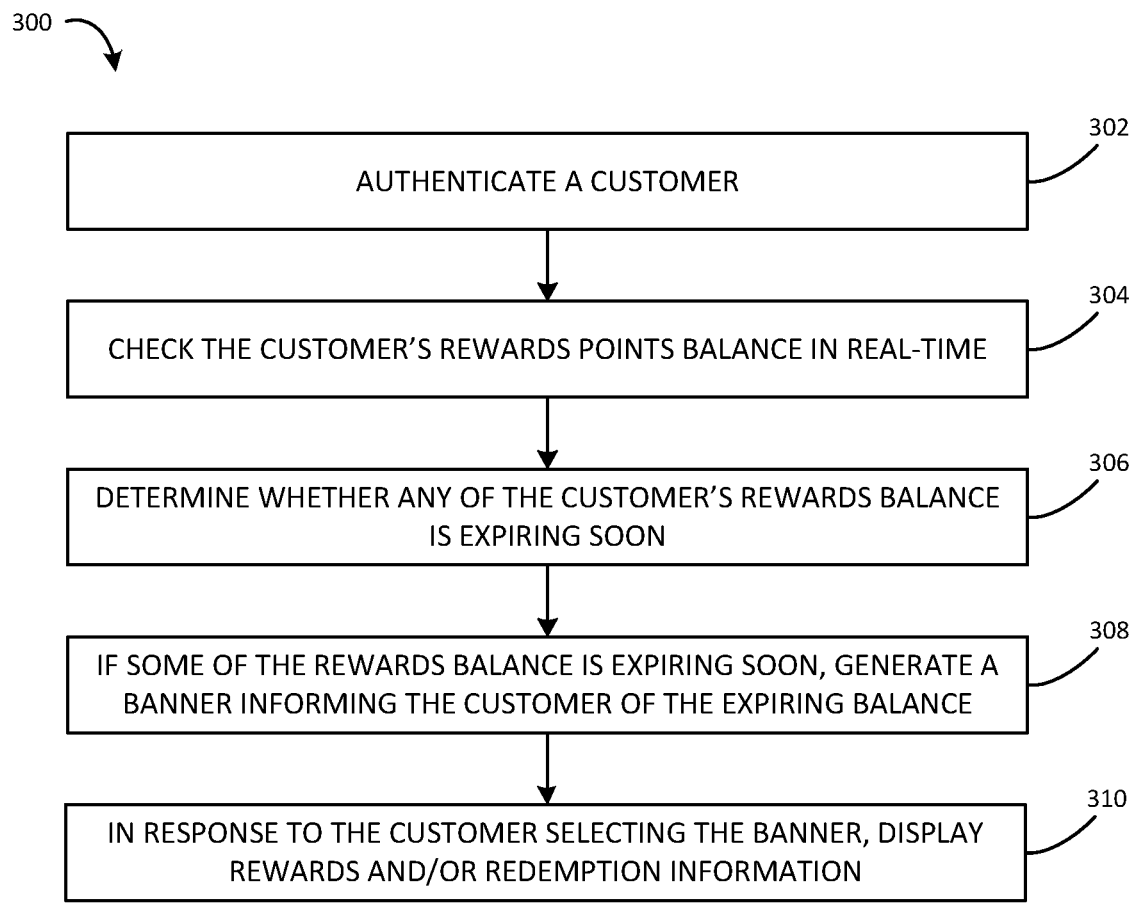
FIG. 3 is a flow diagram illustrating a method of generating a banner that notifies a customer of an expiring rewards balance that is displayed on an ATM, according to an example embodiment.

Referring now to FIG. 3, a flow diagram illustrating a method 300 of generating a banner notifying a customer of an expiring rewards balance is shown, according to an example embodiment. First, the customer is authenticated at an ATM (e.g., ATM 104) at 302. In various embodiments, the rewards redemption circuit 136 is configured to authenticate the customer similarly to the process described above with respect to step 202 of method 200 (e.g., through a payment card and PIN, through a mobile wallet).

Once the customer is authenticated, the customer's rewards balance is checked in real-time at 304. In various embodiments, the rewards redemption circuit 136 is configured to check the customer's rewards balance similarly to the process described above with respect to step 204 of method 200 (e.g., by communicating with the rewards database 122 of the issuer computing system 102).

Based on the customer's real-time rewards balance, whether any of the customer's rewards balance is expiring soon is determined at 306. In some embodiments, the rewards redemption circuit 136 is configured to determine whether any of the customer's rewards balance is expiring soon based on expiration dates for the customer's rewards balance and whether any those dates is within a certain amount of time from the present day, such as a certain time period from the present day (e.g., within ninety days, within sixty days, within thirty days, within a week) or a certain calendar period from the present day (e.g., by the end of the next month, by the end of the present month, by the end of the week).

If some (or all) of the customer's rewards balance is expiring soon, a banner informing the customer of the expiring balance is generated at 308. In some embodiments, the rewards redemption circuit 136 is configured to generate a banner indicating that a portion of the customer's rewards balance is expiring and that the customer should select the banner to redeem the rewards balance. In other embodiments, as discussed above with reference to FIG. 1, the rewards redemption circuit 136 is configured to include additional information in the banner, such as the amount of the customer's rewards balance that is expiring soon or for what the customer can redeem the expiring rewards balance (e.g., cash dispensed by the ATM 104, an account credit, a travel item such as a ticket). Additionally, the banner is configured such that the banner is selectable by the customer (e.g., by a touchscreen of the display 134 of the ATM 104, by an input/output device of the ATM 104).

In response to the customer selecting the banner, rewards and/or redemption information is shown to the customer at 310. In some embodiments, the customer is redirected to a screen showing the customer the customer's current rewards balance and the amount of the customer's rewards balance that is expiring. Additionally, in certain embodiments, the screen includes or can be configured to include the customer's rewards balance from multiple rewards accounts held by the customer (e.g., the rewards balance for a personal account held by the customer and the rewards balance for a business account held by the customer), including an indication of portions of each of the customer's rewards accounts that are expiring soon. In such embodiments, the screen also includes a section the customer can use to redeem some or all of the customer's rewards balance. In various arrangements, the redemption section of the screen is configured similarly to the redemption section for the rewards redemption banner discussed above with respect to step 210 of method 200.

Figure 4:
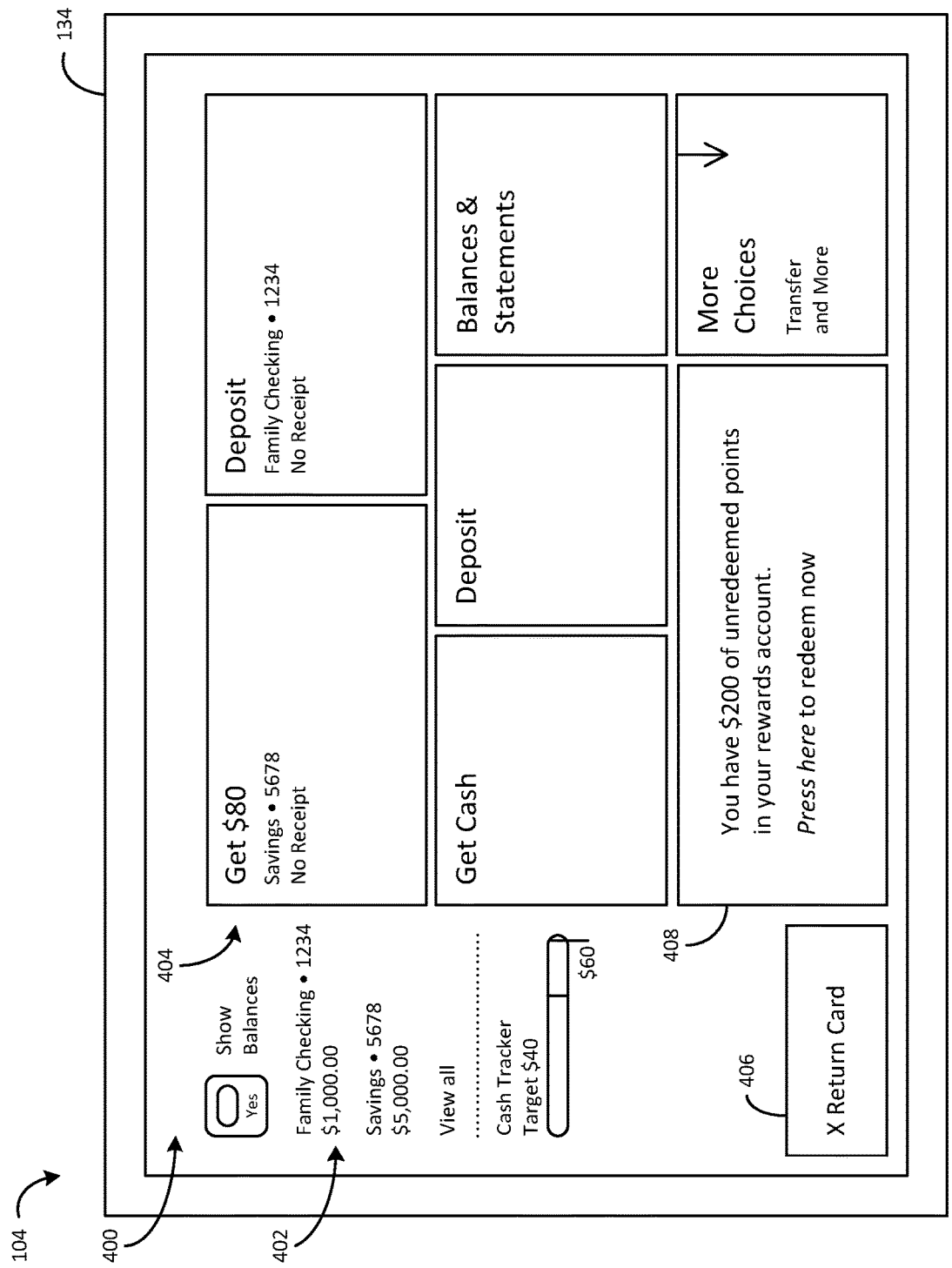
FIGS. 4-8 are graphical user interfaces shown by an ATM display to a customer relating to the customer's rewards balance, according to example embodiments.
Figure 5:
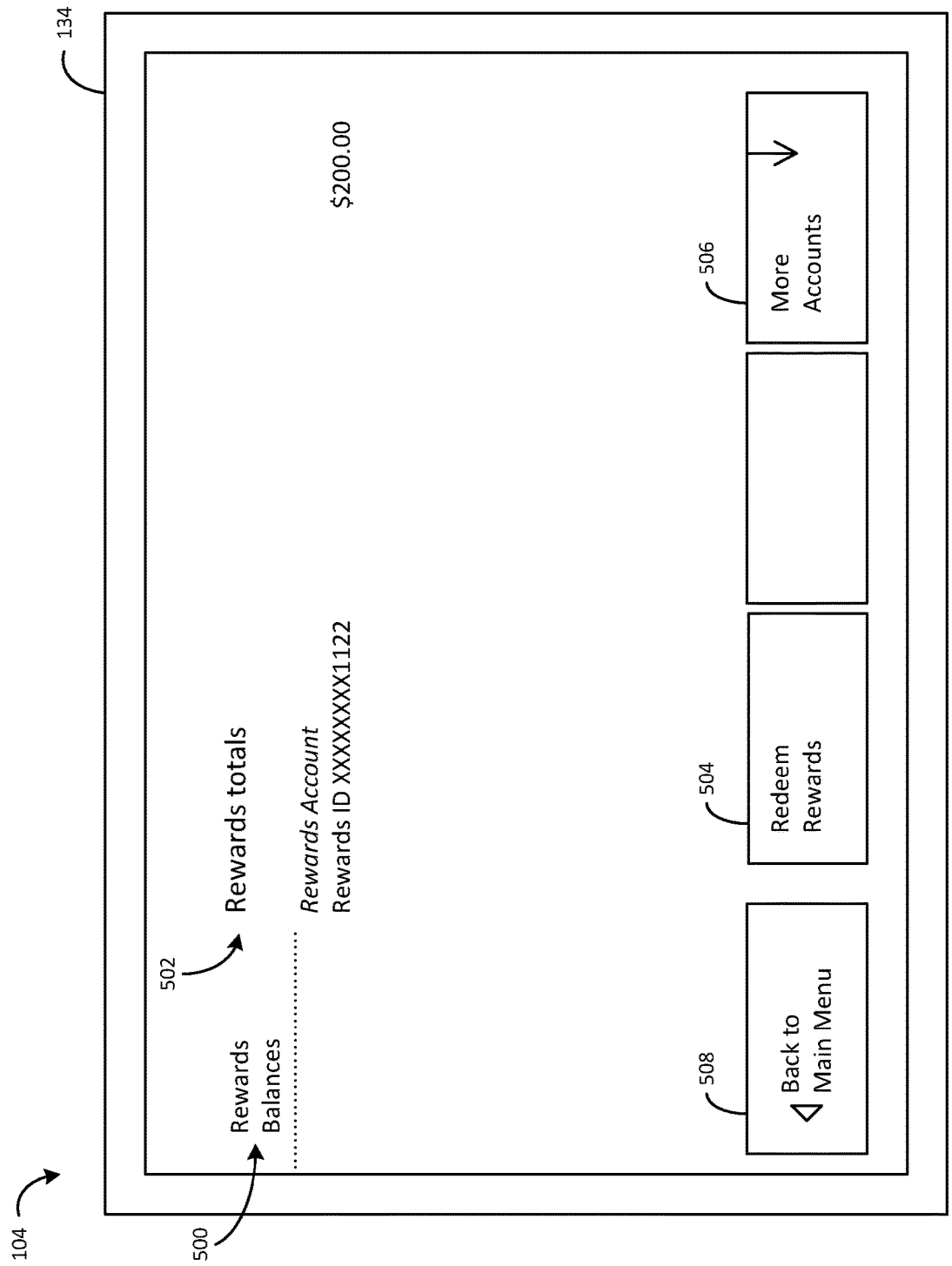

Referring now to FIGS. 4-8, graphical user interfaces displayed on the ATM 104 are illustrated, according to example embodiments. More specifically, FIGS. 4-8 depict example screenshots observable by a customer on the display 134 of the ATM 104 including rewards redemption banners generated based on the customer's real-time rewards balance. To begin with, FIG. 4 shows a main menu screen 400 of the ATM 104. The main menu screen 400 includes account information 402 for the customer, for example, indicating the last four digits of each of the customer's accounts and the balance in each of the accounts. The main menu screen 400 also includes a number of buttons 404 the customer can select to access banking services offered by the ATM 104. Finally, the main menu screen 400 shown in FIG. 4 includes a "Return Card" button 406 that the customer can select, in response to which the ATM 104 will return the customer's payment card used to access the ATM 104 and the customer will be deauthorized from using the banking services offered by the ATM 104. It should be understood, however, that the exit button is configured differently in other embodiments (e.g., if the customer instead uses a mobile wallet to access the ATM 104).

As shown in FIG. 4, the banking services buttons 404 of the main menu screen 400 are directed to a number of different services offered by the ATM 104. In one example, the banking services buttons 404 include the customer's favorite past ATM banking options (e.g., in the embodiment of FIG. 4, withdrawing $80 from the customer's 5678 Savings account with no receipt and making a deposit to the customer's 1234 Family Checking account with no receipt), basic services offered by the ATM 104 (e.g., in the embodiment of FIG. 4, withdrawing cash, making a deposit, and viewing the customer's balances and statements), and an option to select more choices. Additionally, the banking services buttons 404 include a rewards redemption banner 408 generated for the customer indicating that the customer has $200 of unredeemed points in the customer's rewards account (e.g., associated with the customer's 1234 Family Checking account). The rewards redemption banner 408 also indicates that the customer can select the banner 408 to redeem the customer's rewards points.

In various embodiments, in response to selecting the rewards redemption banner 408, a rewards functionality of the ATM 104 is activated. Accordingly, the customer is redirected to another screen allowing the customer to view rewards information and/or redeem the customer's rewards balance, such as the rewards balances screen 500 shown in FIG. 5. The rewards balances screen 500 includes rewards totals 502 for the customer (e.g., in the embodiment of FIG. 5, a total of $200.00 of unredeemed rewards for the customer's rewards account ending in 1122). The rewards balances screen 500 also includes a number of buttons associated with selectable options. These buttons include a rewards redemption button 504 that the customer can press to redeem some or all of the customer's rewards balance. As an example, in response to the customer pressing the rewards redemption button 504, the ATM 104 redirects the customer to a rewards redemption screen that the customer can use to select how much of the customer's rewards balance the customer would like to redeem and for what the customer would like to redeem the selected rewards balance. The rewards balances screen 500 also includes a more accounts button 506 that the customer can select to view rewards information for more of the customer's accounts (e.g., for a business account that the customer holds in addition to personal accounts). Finally, the rewards balances screen 500 includes a main menu button 508 that the customer can select to return to a main menu of the ATM 104 (e.g., the main menu screen 400 shown in FIG. 4).

Figure 6:
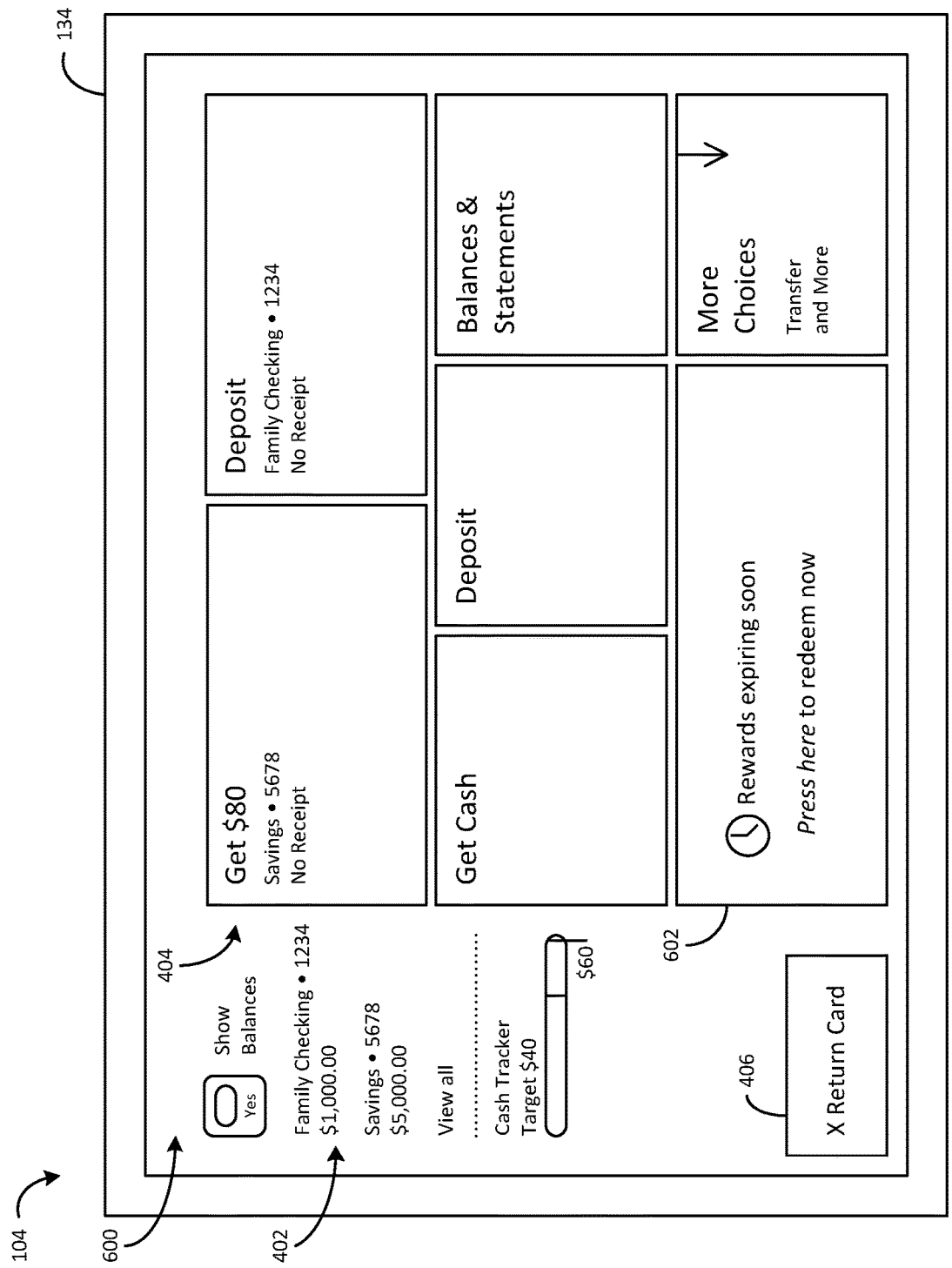
Figure 7:
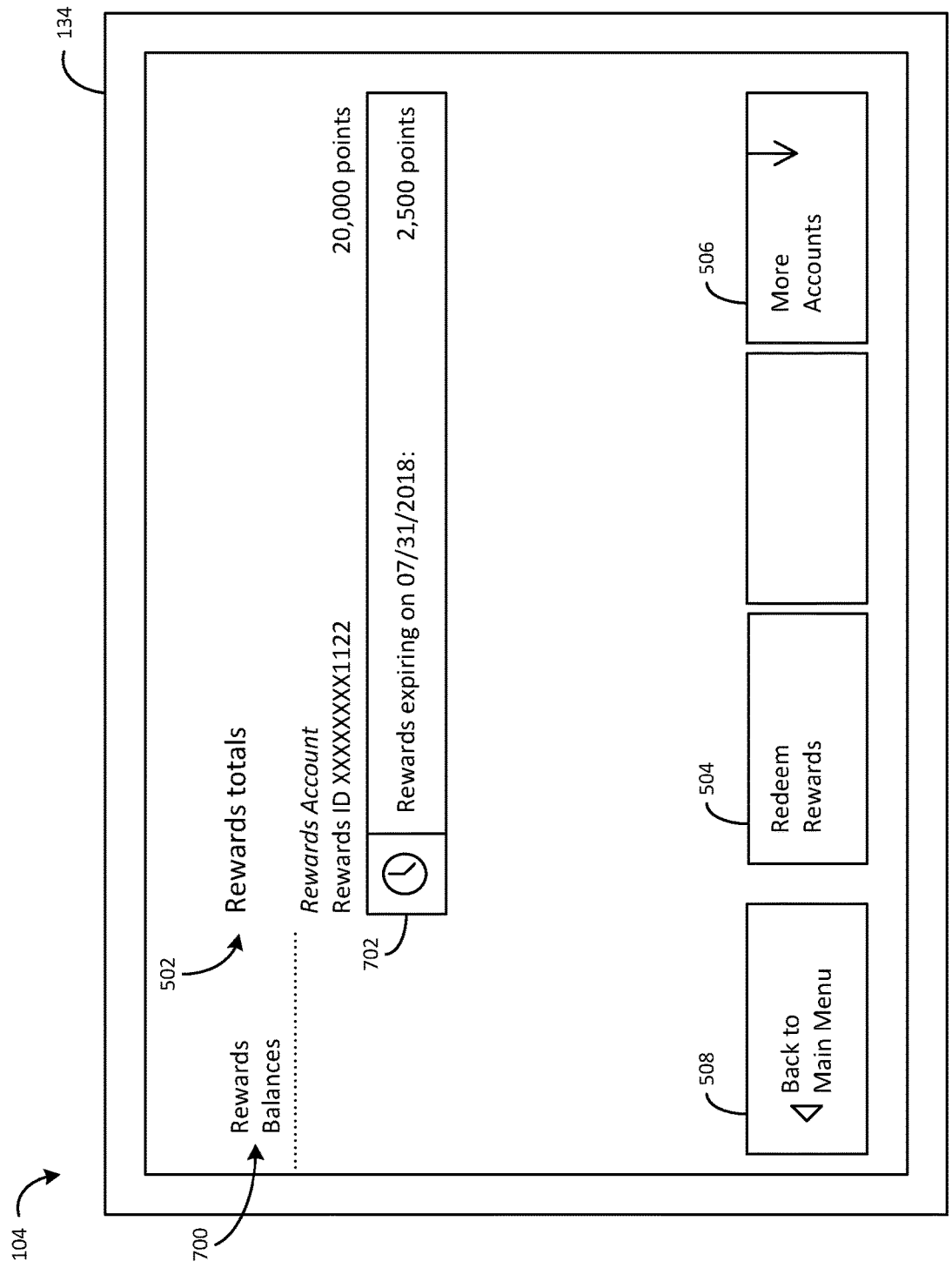

FIG. 6 illustrates an alternate main menu screen 600 observable by a customer. Similar to the main menu screen 400 of FIG. 4, the main menu screen 600 includes account information 402 for the customer, a number of buttons 404 the customer can select to access banking services offered by the ATM 104, and a "Return Card" button 406 that the customer can select to have the customer's payment card returned by the ATM 104 and be deauthorized from the banking services offered by the ATM 104. However, in the main menu screen 600, the banking services buttons 404 include an expiring rewards banner 602 indicating that the customer has rewards that are expiring soon. The expiring rewards banner 602 also indicates that the customer can select the banner 602 to redeem the customer's expiring rewards.

In various embodiments, in response to selecting the expiring rewards banner 602, a rewards functionality of the ATM 104 is activated. As such, the customer is redirected to another screen allowing the customer to view rewards information, including information about the customer's expiring rewards, and redeem the customer's rewards balance, such as the rewards balances screen 700 shown in FIG. 7. Similar to the rewards balances screen 500 shown in FIG. 5, the rewards balances screen 700 includes rewards totals 502 for the customer (e.g., in the embodiment of FIG. 7, a total of 20,000 unredeemed rewards points for the customer's rewards account ending in 1122). The rewards balances screen 700 also similarly includes a rewards redemption button 504 that the customer can press to redeem some or all of the customer's rewards balance, a more accounts button 506 that the customer can select to view rewards information for more of the customer's accounts, and a main menu button 508 that the customer can select to return to a main menu of the ATM 104 (e.g., the main menu screen 600 shown in FIG. 6). In addition, however, the rewards balances screen 700 also includes a box 702 indicating the amount of the customer's rewards balance that is expiring soon and when that balance is expiring (e.g., in the embodiment of FIG. 7, indicating the 2,500 of the customer's rewards points are expiring on Jul. 31, 2018). It should be understood, however, the expiring balance box 702 is configured differently in different embodiments. For example, in another embodiment, the expiring balance box 702 includes a suggested redemption item that the customer can select to quickly redeem the expiring rewards balance (e.g., select to redeem the expiring 2,500 points for $25 in cash).

Figure 8:
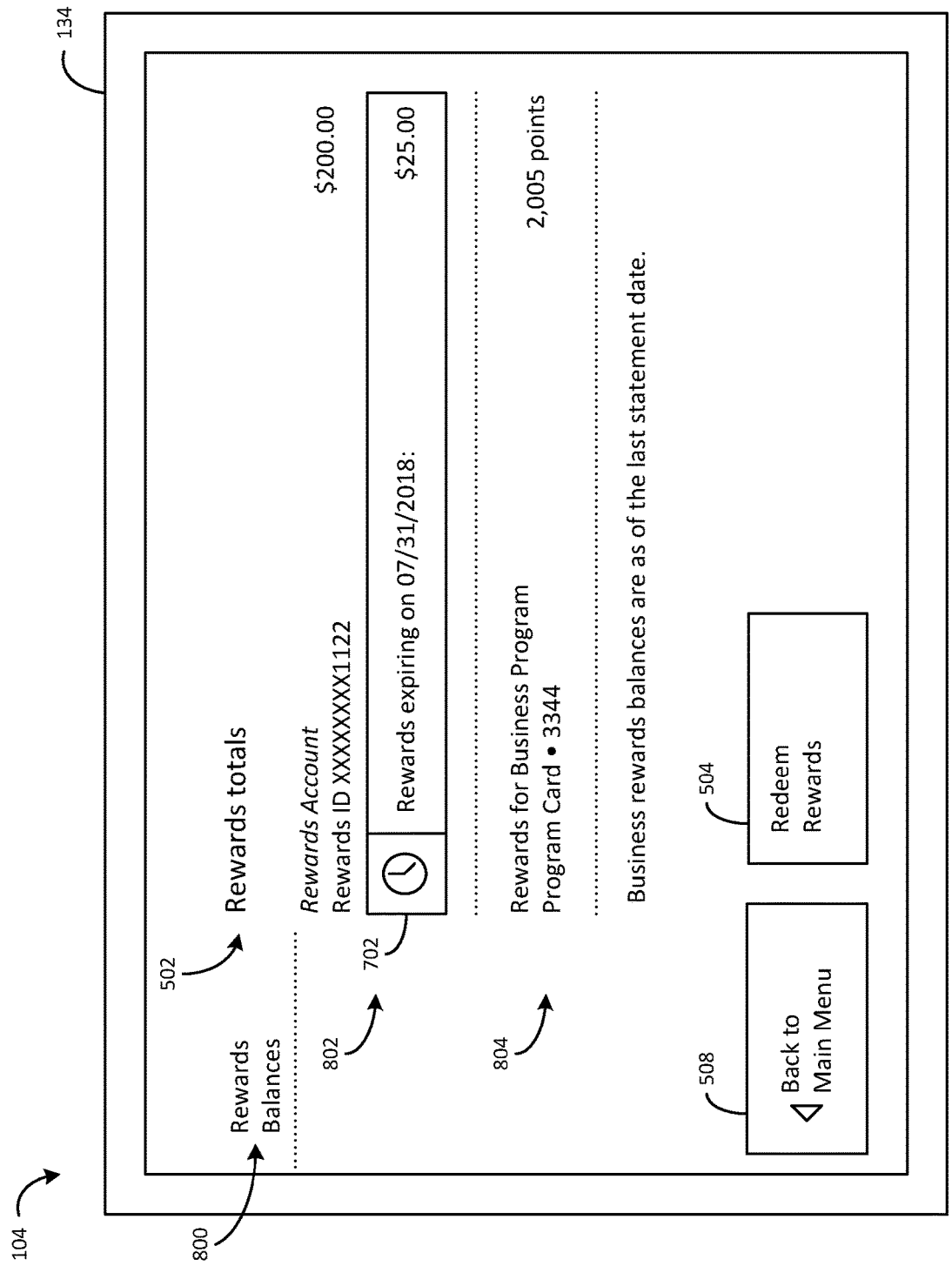

FIG. 8 illustrates an alternate rewards balance screen 800 observable by a customer. In one example, the rewards balance screen 800 is shown to the customer instead of the rewards balances screen 700 of FIG. 7 in response to the customer selecting the expiring rewards banner 602. In another example, the rewards balance screen 800 is shown to the customer in response to the customer selecting the more accounts button 506 on the rewards balances screen 700 of FIG. 7 (e.g., such that the customer is no longer shown the more accounts button 506 in the rewards balance screen 800). The rewards balance screen 800 is similar to the rewards balances screen 700 of FIG. 7, including rewards totals 502 for the customer and the expiring balance box 702 indicating the amount of the customer's rewards balance that is expiring soon and when that balance is expiring. The rewards balance screen 800 also includes a rewards redemption button 504 that the customer can select to redeem some or all of the customer's rewards balance and a main menu button 508 that the customer can select to return to a main menu of the ATM 104 (e.g., the main menu screen 600 shown in FIG. 6).

In addition, however, the rewards totals 502 of the rewards balance screen 800 includes a first rewards section 802 and a second rewards section 804. The first rewards section 802 includes rewards information for a first rewards account held by the customer. For example, in the embodiment of FIG. 8, the first rewards section 802 includes rewards information for a rewards account ending in 1122 that includes $200.00 of total unredeemed rewards and $25.00 of unredeemed rewards that are expiring by Jul. 31, 2018, as indicated by the expiring balance box 702. The second rewards section 804 includes rewards information for a second rewards account held by the customer. As an example, in the embodiment of FIG. 8, the second rewards section 804 includes rewards information for a Rewards for Business Program account held by the customer, ending in 3344, that includes 2,005 unredeemed points. The second rewards section 804 also includes an indication to the customer that business rewards balances are as of the last statement date (e.g., the rewards information for the account ending in 1122 is pulled in real-time for the customer, but the rewards information for the account ending in 3344 is only updated according to the last statement date for the customer).

It should also be understood that in other embodiments, the rewards totals 502 includes additional and/or different account information for the customer. For example, if the customer holds additional rewards accounts other than the rewards account ending in 1122 and the rewards account ending in 3344, the rewards totals 502 includes additional information for those rewards accounts or includes the ability for the customer to scroll to view the additional information for those rewards accounts. As another example, the rewards totals 502 includes information about which payment account(s) held by the customer each of the customer's rewards accounts is connected to, how the customer can earn more rewards for each of the customer's rewards accounts (e.g., by shopping through preferred vendors, by spending money on certain categories of items), and so on.

Furthermore, those of skill in the art will appreciate that FIGS. 4-8 are meant to be illustrative, rather than limiting. For example, in other embodiments, the main menu screens 400 and 600 are configured differently, such as including a different number, order, or type of banking services buttons 404. As another example, in other embodiments, the rewards redemption banner 408 or the expiring rewards banner 602 is displayed differently, such as displayed as a pop-up notification triggered when the customer is authorized at the ATM 104 or when the customer selects a button redirecting the customer to view account balances or rewards information.

Figure 9:
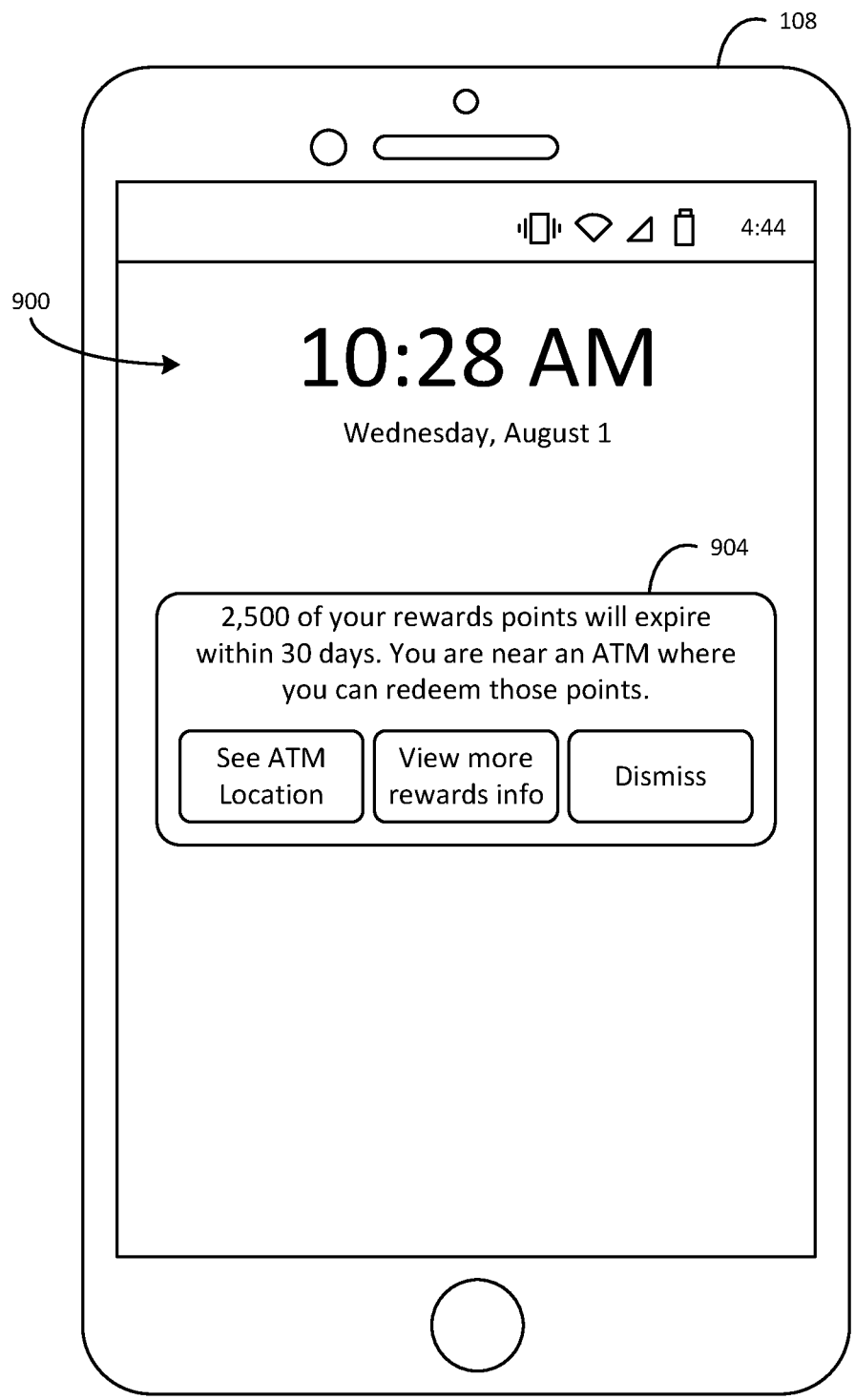
FIG. 9 is a graphical user interface shown by a mobile device display to a customer relating to the customer's rewards balance, according to an example embodiment.

Referring now to FIG. 9, an example screenshot of a home screen 900 of the mobile device 108 associated with a customer, according to one embodiment, of the issuer is shown. The home screen 900 includes a push notification 904 notifying the customer that 2,500 of the customer's rewards points will expire within 30 days. The push notification 904 also notifies the customer that the customer is near an ATM (e.g., ATM 104) where the customer can redeem those rewards points. The push notification 904 further includes several buttons that the customer can press: one for the customer to see the ATM location, one for the customer to see more information about the customer's rewards account, and one to dismiss the push notification. In some embodiments, the customer receives the push notification based on the ATM 104 determining that the customer's mobile device 108 is near the ATM 104 (e.g., based on GPS location information gathered by a banking application associated with the issuer that is running on the mobile device 108). The ATM 104 then transmits the notification information to the mobile device 108 (e.g., to the banking application running on the mobile device 108, which displays the notification information to the customer as the push notification 904).

However, it should be understood that the push notification 904 shown in FIG. 9 is exemplary and that other notifications transmitted by the ATM 104 are contemplated by this disclosure. For example, in various arrangements, the ATM 104 instead transmits an email to the customer or a text message to the mobile device 108. Furthermore, in other embodiments, the notification includes different or additional information. As an example, the notification includes information on the customer's total rewards balance, ads for items that the customer can redeem the rewards balance for (e.g., determined based on the customer's rewards redemption history, determined based on the redemption histories of other customers similar to the customer), and so on.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud-based processor). Alternatively, or additionally, the one or more processors are internal and/or local to the apparatus. Accordingly, an exemplary system for implementing the overall system or portions of the embodiments might include general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon. Thus, in these arrangements, personal information about the user of the device, financial data, and other types of data is encrypted and transmitted to prevent or substantially prevent the threat of hacking.

In certain embodiments, an "input/output device" as used herein includes hardware and associated logics configured to enable a party to exchange information with a computing device to which the input/output device is connected. In various embodiments, an input aspect of an input/output device allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output device allows a party to receive information from the computing device and includes, for example, a display, a printer, a speaker, illuminating icons, LEDs, an output device engageable to the computing device via a USB, wirelessly, and so on, or any other type of output device capable of being used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. An automated teller machine (ATM) comprising:
   a network interface configured to communicate data via a network; and
   a processing circuit comprising a processor and a memory, the memory structured to store instructions that are executable by the processor and cause the processing circuit to:
   determine that a mobile device of a customer is proximate the ATM;
   upon determining that the mobile device of the customer is proximate the ATM:
   retrieve, by the network interface, a real-time rewards balance of a rewards account associated with the customer;
   determine that at least a portion of the real-time rewards balance is expiring within a certain amount of time;
   generate a push notification to be displayed on the mobile device of the customer, the push notification including a first indication that the at least a portion of the real-time rewards balance is expiring within the certain amount of time, a second indication that the customer is near the ATM where the customer can redeem the at least a portion of the real-time rewards balance that is expiring, and a button configured to be pressed by the customer on the mobile device to view a location of the ATM; and
   transmit the push notification to the mobile device of the customer.

2. The ATM of claim 1, wherein the push notification further includes the customer's present location and the customer's real-time rewards balance.

3. The ATM of claim 1, wherein the instructions further cause the processing circuit to determine one or more suggested rewards items based on redemption histories of other customers similar to the customer, and wherein the push notification further includes the one or more suggested rewards items.

4. The ATM of claim 1, wherein the ATM comprises an input/output device configured to exchange data with the customer.

5. The ATM of claim 4, wherein the input/output device comprises at least one of a near-field communication device or a radio frequency identification device and the instructions further cause the processing circuit to:
receive authentication information from the mobile device of the customer via the at least one of the near-field communication device or the radio frequency identification device.

6. The ATM of claim 5, wherein the authentication information includes a biometric provided by the customer to the mobile device and communicated to the ATM via the at least one of the near-field communication device or the radio frequency identification device.

7. The ATM of claim 5, wherein the instructions further cause the processing circuit to:
authenticate the customer at the ATM using the authentication information;
receive a selection to redeem the at least a portion of the real-time rewards balance that is expiring soon for a cash amount; and
dispense the cash amount to the customer.

8. A method of generating a notification for a customer, comprising:
determining, by an automated teller machine (ATM), that a mobile device of the customer is proximate the ATM;
upon determining that the mobile device of the customer is proximate the ATM:
retrieving, by the ATM, a real-time rewards balance of a rewards account associated with the customer;
determining, by the ATM, that at least a portion of the real-time rewards balance is expiring within a certain amount of time;
generating, by the ATM, a push notification to be displayed on the mobile device of the customer, the push notification including a first indication that the at least a portion of the real-time rewards balance is expiring within the certain amount of time, a second indication that the customer is near the ATM where the customer can redeem the at least a portion of the real-time rewards balance that is expiring, and a button configured to be pressed by the customer on the mobile device to view a location of the ATM; and
transmitting, by the ATM, the push notification to the mobile device of the customer.

9. The method of claim 8, wherein the push notification further includes the customer's present location.

10. The method of claim 8, further comprising determining one or more suggested rewards items based on redemption histories of other customers similar to the customer, and wherein the push notification further includes the one or more suggested rewards items.

11. The method of claim 8, wherein the push notification further includes the customer's real-time rewards balance.

12. The method of claim 8, further comprising receiving authentication information from the mobile device of the customer via at least one of a near-field communication device of the ATM or a radio frequency identification device of the ATM.

13. The method of claim 12, wherein the authentication information includes a biometric provided by the customer to the mobile device and communicated to the ATM via the at least one of the near-field communication device or the radio frequency identification device.

14. The method of claim 13, further comprising:
authenticating, by the ATM, the customer at the ATM using the authentication information;
receiving, by the ATM, a selection to redeem the at least a portion of the real-time rewards balance that is expiring soon for a cash amount; and
dispensing, by the ATM, the cash amount to the customer.

15. One or more non-transitory computer-readable storage media having instructions stored thereon that, when executed by at least one processing circuit, cause the at least one processing circuit to:
determine that a mobile device of a customer is proximate an ATM;
upon determining that the mobile device of the customer is proximate the ATM:
retrieve a real-time rewards balance of a rewards account associated with the customer;
determine that at least a portion of the real-time rewards balance is expiring within a certain amount of time;
generate a push notification to be displayed on the mobile device of the customer, the push notification including a first indication that the at least a portion of the real-time rewards balance is expiring within the certain amount of time, a second indication that the customer is near the ATM where the customer can redeem the at least a portion of the real-time rewards balance that is expiring, and a button configured to be pressed by the customer on the mobile device to view a location of the ATM; and
transmit the push notification to the mobile device of the customer.

16. The one or more non-transitory computer-readable storage media of claim 15, wherein the push notification further includes at least one of the customer's present location or the customer's real-time rewards balance.

17. The one or more non-transitory computer-readable storage media of claim 15, wherein the instructions further cause the at least one processing circuit to determine one or more suggested rewards items based on redemption histories of other customers similar to the customer, and wherein the push notification further includes the one or more suggested rewards items.

18. The one or more non-transitory computer-readable storage media of claim 15, wherein the instructions further cause the at least one processing circuit to receive authentication information from the mobile device of the customer via at least one of a near-field communication device of the ATM or a radio frequency identification device of the ATM.

19. The one or more non-transitory computer-readable storage media of claim 18, wherein the authentication information includes a biometric provided by the customer to the mobile device and communicated to the ATM via the at least one of the near-field communication device or the radio frequency identification device.

20. The one or more non-transitory computer-readable storage media of claim 19, wherein the instructions further cause the at least one processing circuit to:
authenticate the customer at the ATM using the authentication information;
receive a selection to redeem the at least a portion of the real-time rewards balance that is expiring soon for a cash amount; and
dispense the cash amount to the customer.

* * * * *